United States Patent
Harris et al.

(10) Patent No.: US 8,510,409 B1
(45) Date of Patent: Aug. 13, 2013

(54) APPLICATION-SPECIFIC OUTBOUND SOURCE ROUTING FROM A HOST IN A DATA NETWORK

(75) Inventors: Arthur Harris, Framingham, MA (US); Dennis Ting, Groton, MA (US); Himabindu Tummala, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 516 days.

(21) Appl. No.: 12/646,294

(22) Filed: Dec. 23, 2009

(51) Int. Cl.
G06F 15/16 (2006.01)
G06F 15/173 (2006.01)

(52) U.S. Cl.
USPC ............... 709/217; 709/238; 709/228

(58) Field of Classification Search
USPC .................................................. 709/217
See application file for complete search history.

(56) References Cited

U.S. PATENT DOCUMENTS

| | | | |
|---|---|---|---|
| 5,870,550 A * | 2/1999 | Wesinger et al. | 709/218 |
| 6,119,170 A * | 9/2000 | Schoffelman et al. | 709/244 |
| 6,275,953 B1 | 8/2001 | Vahalia et al. | |
| 6,453,354 B1 | 9/2002 | Jiang et al. | |
| 6,625,750 B1 | 9/2003 | Duso et al. | |
| 6,735,773 B1 * | 5/2004 | Trinh et al. | 719/328 |
| 6,826,580 B2 | 11/2004 | Harris et al. | |
| 7,145,866 B1 | 12/2006 | Ting et al. | |
| 7,346,909 B1 * | 3/2008 | Eldar et al. | 719/312 |
| 7,383,463 B2 | 6/2008 | Hayden et al. | |
| 7,546,364 B2 | 6/2009 | Raman et al. | |
| 7,599,997 B1 | 10/2009 | Fein et al. | |
| 7,606,804 B2 | 10/2009 | McDonald | |
| 7,761,562 B1 * | 7/2010 | Stewart et al. | 709/224 |
| 7,894,456 B2 * | 2/2011 | Koskelainen | 370/401 |
| 7,940,768 B2 * | 5/2011 | Masputra et al. | 370/392 |
| 2003/0185233 A1 * | 10/2003 | Ji et al. | 370/466 |
| 2004/0268358 A1 * | 12/2004 | Darling et al. | 718/105 |
| 2005/0038906 A1 * | 2/2005 | Banes et al. | 709/238 |
| 2007/0058606 A1 * | 3/2007 | Koskelainen | 370/351 |
| 2007/0183347 A1 * | 8/2007 | Gu et al. | 370/258 |
| 2007/0211690 A1 * | 9/2007 | van Megen et al. | 370/351 |

OTHER PUBLICATIONS

G. Huston, Architectural Approaches to Multi-homing for IPv6, Network Working Group Request for Comments: 4177, Sep. 2005, 36 pages, The Internet Society, Reston, VA.

J. Abley et al., Goals for IPv6 Site-Multihonning Architectures, Network Working Group Request for Comments: 3582, Aug. 2003, 9 pages, The Internet Society, Reston, VA.

(Continued)

*Primary Examiner* — Ario Etienne
*Assistant Examiner* — Blake Rubin
(74) *Attorney, Agent, or Firm* — Richard Auchterlonie; Novak Druce Connolly Bove + Quigg LLP

(57) ABSTRACT

An application program of a multi-homed host computer at a multi-homed Internet site specifies a destination IP address, a local network interface device and a local site gateway to the network layer of the host computer when establishing a remote TCP connection to the destination IP address, and then the network layer of the operating system of the host computer uses only this specified outbound source path for the remote TCP connection instead of an outbound source path from an operating system supplied routing table. This allows the host application to have control over its remote output paths and provides the host application with the ability to create private remote connections.

20 Claims, 6 Drawing Sheets

(56) References Cited

OTHER PUBLICATIONS

EMC PowerPath Family, Data Sheet, 6 pages, Jul. 2009, EMC Corporation, Hopkinton, MA.

H. Frazier et al., Link Aggregation and Trunking, IEEE 802 LMSC Tutorial, Nov. 11, 1997, Montreal, PQ, 49 pages, IEEE, New York, NY.

TCP/IP, Kioskea.net, Oct. 16, 2008, 7 pages, Communitic International LLC, Immeuble hertz, rue des entrepreneurs, Z.I. Cahrguia II-2035-TUNIS.

The OSI (Open System Interconnection) Model, printed Nov. 11, 2009, 7 pages, infocellar.com.

Gandalf, Internet Programming with Windows—A Tutorial Part 1, Feb. 2000, 11 pages, Gandalf@dhama.org.uk, exegesis.uklinux.net/gandalf.

Gandalf, Internet Programming with Windows—A Tutorial Part 2, Mar. 2000, 17 pages, Gandalf@dhama.org.uk, exegesis.uklinux.net/gandalf.

Getsockopt Function (Windows), Nov. 12, 2009, 11 pages, Microsoft Corporation, Redmond, WA.

Bind Function (Windows), Nov. 12, 2009, 5 pages, Microsoft Corporation, Redmond, WA.

Berkeley sockets, Wikipedia, Nov. 21, 2009, 14 pages, Wikimedia Foundation, Inc., San Francisco, CA.

Bind(2), UNIX man pages, FreeBSD System Calls Manual, fuse4bsd.creo.hu, 1994, 2 pages, The FreeBSD Foundation, Boulder, CO.

TCP-Level Socket Options, printed Nov. 23, 2009, 1 page, Universidad Nacional de Lujan, Buenos Aires, Argentina.

* cited by examiner

APPLICATION-SPECIFIC OUTBOUND SOURCE ROUTING FROM A HOST IN A DATA NETWORK

FIELD OF THE INVENTION

The present invention generally relates to data processing networks, and more particularly to a host computer having a plurality of outbound source paths for transmitting data to another host computer in a data processing network.

BACKGROUND OF THE INVENTION

For increased transmission bandwidth and reliability, a local host computer in a data processing network often has a plurality of outbound source paths for transmitting data to a remote host computer in the data network. Each outbound source path may include a selected network interface device of the local host, and a selected gateway connecting the local host computer to the data network.

A conventional practice has been for the network layer of the operating system of a local host to select for a host application a particular one of a number of possible outbound source paths in a fashion that is transparent to the host application. For example, the host application calls an application program interface (API) function of a network layer program in order to establish a connection to a destination address of a remote host, and upon receiving confirmation from the API function that a connection has been established, the host application writes data to a socket for the connection. The operating system then routes packets of the data from the socket to the destination address of the remote host depending on the availability of the possible paths and often depending on loading conditions of the possible paths.

In an Internet-Protocol (IP) data network, selection of data paths between a host and the Internet occurs for a so-called "multi-homed host" having more than one IP address, and for a host at a so-called "multi-homed site" having more than one IP service provider.

Multi-homed Internet hosts are discussed in G. Houston, Architectural Approaches to Multi-homing for IPv6, Network Working Group Request for Comments: 4177, September 2005, The Internet Society. The environment of multi-homing is intended to provide sufficient support to local hosts so as to allow local hosts to exchange IP packets with remote hosts, such that this exchange of packets is transparently supported across dynamic changes in connectivity. Session resilience implies that if a local multi-homed-aware host establishes an application session with the remote host using "Path A", and this path fails, the application session should be mapped across to "Path B" without requiring any application-visible re-establishment of the session. In other words, the application session should not be required to be explicitly aware of underlying path changes at the level of packet forwarding paths chosen by the network. Established sessions should survive dynamic changes in network-level reachability.

Multi-homed Internet sites are discussed in J. Abley et al., Goals for IPv6 Site-Multihoming Architectures, Network Working Group Request for Comments: 3582, August 2003, The Internet Society. By multihoming, a site should be able to insulate itself from certain failure modes within one or more transit providers, as well as failures in the network providing interconnection among one or more transit providers. By multihoming, a site should be able to distribute both inbound and outbound traffic between multiple transit providers. This goal is for concurrent use of the multiple transit providers, not just the usage of one provider over one interval of time and another provider over a different interval.

SUMMARY OF THE INVENTION

It is sometimes desired for data of a particular application to be transmitted from a host computer using a particular outbound source path. For example, a remote application on a remote host computer may have a dependency upon receiving data from a specific network interface on a local host computer, such that only one network interface on the local host computer should be used for transmitting data to the remote host computer. In another example, a local application on the local host computer may often have a very high demand for network bandwidth for transmission from the local host computer, so that the local application should have more control over selection of its outbound source path.

A solution to this problem is for the network layer of the host computer to provide a host application with the ability to specify a particular outbound source path when establishing a remote connection. For example, a host application specifies a destination IP address, a local network interface device and a local site gateway when establishing a remote connection to the destination IP address, and the network layer of the operating system of the host computer uses only this specified outbound source path for the remote connection. This allows the host application to have control over its remote output paths and provides the host application with the ability to create private remote connections.

In accordance with one aspect, the invention provides a computer-implemented method of routing data to a data network from a host computer. The host computer is connected to the data network to provide a plurality of outbound source paths for transmission of data from the host computer to the data network. The host computer has memory and at least one data processor coupled to the memory for executing programs in the memory. The method includes the at least one data processor executing a network layer program in the memory to establish remote connections for transmission of data from execution of application programs in the memory to remote destinations in the data network, and to select particular outbound source paths for transmission of the data over the remote connections when the execution of the application programs does not specify particular outbound source paths for the transmission of data over the remote connections, and to use application-specified outbound source paths for transmission of the data over the remote connections when the execution of the application programs specify particular outbound source paths for the transmission of data over the remote connections.

In accordance with another aspect, the invention provides a computer-implemented method of routing data to the Internet from a host computer. The host computer has memory and at least one data processor coupled to the memory for executing programs in the memory. The host computer is connected to the Internet to provide a plurality of outbound source paths for transmission of data from the host computer to the Internet. The method includes the at least one data processor executing a network layer program in the memory to establish remote Transmission Control Protocol (TCP) connections for transmission of data from execution of application programs in the memory to remote destinations in the Internet, and to select based on current loading conditions particular outbound source paths for transmission of the data over the remote TCP connections when the execution of the application programs does not specify particular outbound source paths for the transmission of data over the remote TCP connections, and to use application-specified outbound source paths for transmission of the data over the remote TCP connections when the execution of the application programs specify particular outbound source paths for the transmission of data over the remote TCP connections.

In accordance with another aspect, the invention provides a host computer. The host computer includes at least one data processor, a plurality of network interface devices coupled to said at least one data processor for connecting the host computer to a data network for providing a plurality of outbound source paths for transmission of data from the host computer to the data network; and memory storing application programs and a network layer program. The memory is coupled to the at least data processor for execution of the application programs and the network layer program by the at least one data processor. The network layer program is executable by the at least one data processor to establish remote connections for transmission of data from execution of the application programs to remote destinations in the data network, and to select particular outbound source paths for transmission of the data over the remote connections when the execution of the application programs does not specify particular outbound source paths for the transmission of data over the remote connections, and to use application-specified outbound source paths for transmission of the data over the remote connections when the execution of the application programs specifies particular outbound source paths for the transmission of data over the remote connections.

BRIEF DESCRIPTION OF THE DRAWINGS

Additional features and advantages of the invention will be described below with reference to the drawings, in which.

Figure 1:
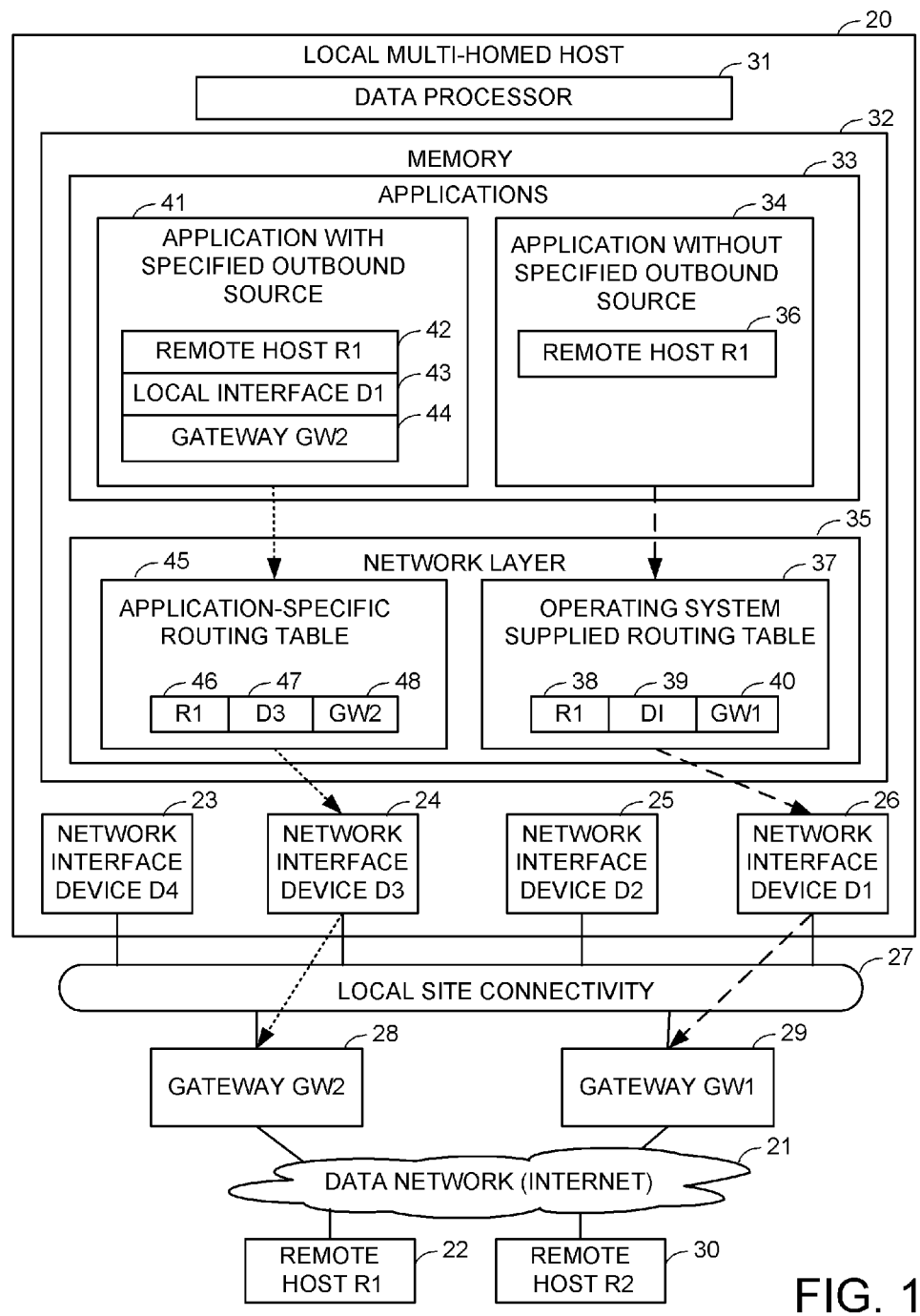
FIG. 1 is a bock diagram of a multi-homed site including a multi-homed host programmed in accordance with the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a multi-homed site including a multi-homed host computer 20 programmed in accordance with the present invention. The multi-homed site includes the host computer 20, local site connectivity 27 such as a local area network, and site gateways 28, 29. The multi-homed host computer 20 has multiple network interface devices 23, 24, 25, and 26 linking the host computer to the gateways 28, 29 via the local site connectivity 27. The gateways 28, 29 provide the host computer 20 with access to a wide area network 21 such as the Internet, so that the host computer 20 may communicate with remote host computers 22, 30.

The multi-homed host computer 20 includes a data processor 31 and random access memory 32. During operation of the host computer 20, the data processor 31 executes application programs 33, which may invoke functions of a network layer 35 of operating system routines for access to the data network 21.

In a conventional mode of operation, an application 34 invokes functions of the network layer in order to establish a remote connection to the remote host 22 over the data network 21. The application 34 specifies that the destination of the remote connection is the remote host 22 but does not specify the outbound source for this connection. Once the network layer 35 has established the remote connection, the application 34 keeps a record 36 of the association of the remote connection with the remote host.

Once the network layer 35 has established the remote connection, the application 34 may send data over the remote connection by invoking a "send" function of the network layer 35. The network layer 35 responds by accessing an operating-system supplied routing table 37 indicating an outbound source for sending the data to the remote host. For example, the routing table 37 includes a first field 38 including an identifier (R1) of the remote host 22, a second field 39 including an identifier (D1) of the network interface device 26, and a third field 40 including an identifier (GW1) of the gateway 29. The network layer 35 uses the identifier (GW1) for addressing a data packet to the gateway 29, and the network layer 35 uses the identifier (D1) for sending a command to the network interface 26 for transmitting the data packet.

The network layer 35 may dynamically change the outbound source paths in the operating-system routing table depending on the availability of the possible paths and depending on loading conditions of the possible paths. This is done in a fashion that is transparent to the application 34. However, it is sometimes desirable for data of a particular host application to be transmitted from the multi-homed host using a particular outbound source path.

For example, a remote application on the remote host computer 22 may have a dependency upon receiving data from a specific network interface device, such that only one network interface on the multi-homed host computer 20 should be used for transmitting data to the remote application. For example, only one or just a few of the network interface devices 23, 24, 25, 26 may have certain data transmission capabilities, such as high bandwidth or real-time data compression or encryption, suitable for a particular remote application.

In another example, a local application on the local host computer may often have a very high demand for network bandwidth for transmission from the local host computer so that the local application should have more control over selection of its outbound source path. For example, a remote replication or backup application may operate most efficiently by streaming data from one of the network interface devices 23, 24, 24, 26 without sharing of the network interface device during the streaming operation. In this case it might not matter which one of the network interface devices is initially selected for a connection.

For similar reasons, a local application of a host computer in a multi-homed site may desire to specify a particular gateway to be used as an outbound source. In addition, each of the gateways 28, 29 could use a different Internet service provider for access to the data network 21. A particular local application may desire to use a particular Internet service provider depending on different costs and levels of service from the Internet service providers.

A solution to this problem is for the network layer 35 of the host computer 20 to provide a host application 41 with the ability to specify a particular outbound source path when establishing a remote connection. For example, the host application 41 specifies the remote host 22, the network interface device 24, and the gateway 28 when establishing a remote connection to the remote host 22, and the network layer 35 of the operating system of the host computer 20 uses only this specified outbound source path for the remote connection. This allows the host application 41 to have control over its remote output paths and provides the host application with the ability to create private remote connections.

For example, the host application 41 invokes the function of the network layer to create a connection to the remote host 22, and also invokes a function to specify that the local interface device 24 and the gateway 28 should be used when sending data over this connection to the remote host 22. The host application 41 keeps a record 42 that the connection is associated with the remote host 22 and also keeps a record 43 that the network interface device 24 is the outbound network interface device for the connection and the gateway 28 is the outbound gateway for the connection.

The network layer 35 maintains an application-specific routing table 45 including a first field 46 containing an identifier (R1) of the remote host, a second field 47 containing an identifier of (D3) the network interface device 24, and a third field 48 containing an identifier (GW2) of the gateway 28. When the application 41 invokes the "send" function to send data over the connection, the network layer 35 responds by checking whether there is an application-specific routing table for the connection, and upon finding that there is an application-specific routing table 45 for the connection, the network layer 35 uses the application-specific routing table (instead of an operating-system supplied routing table) for routing the data to the network interface device 24 and from the network interface device 24 to the gateway 28 for transmission over the data network 21 to the remote host 22.

Figure 2:
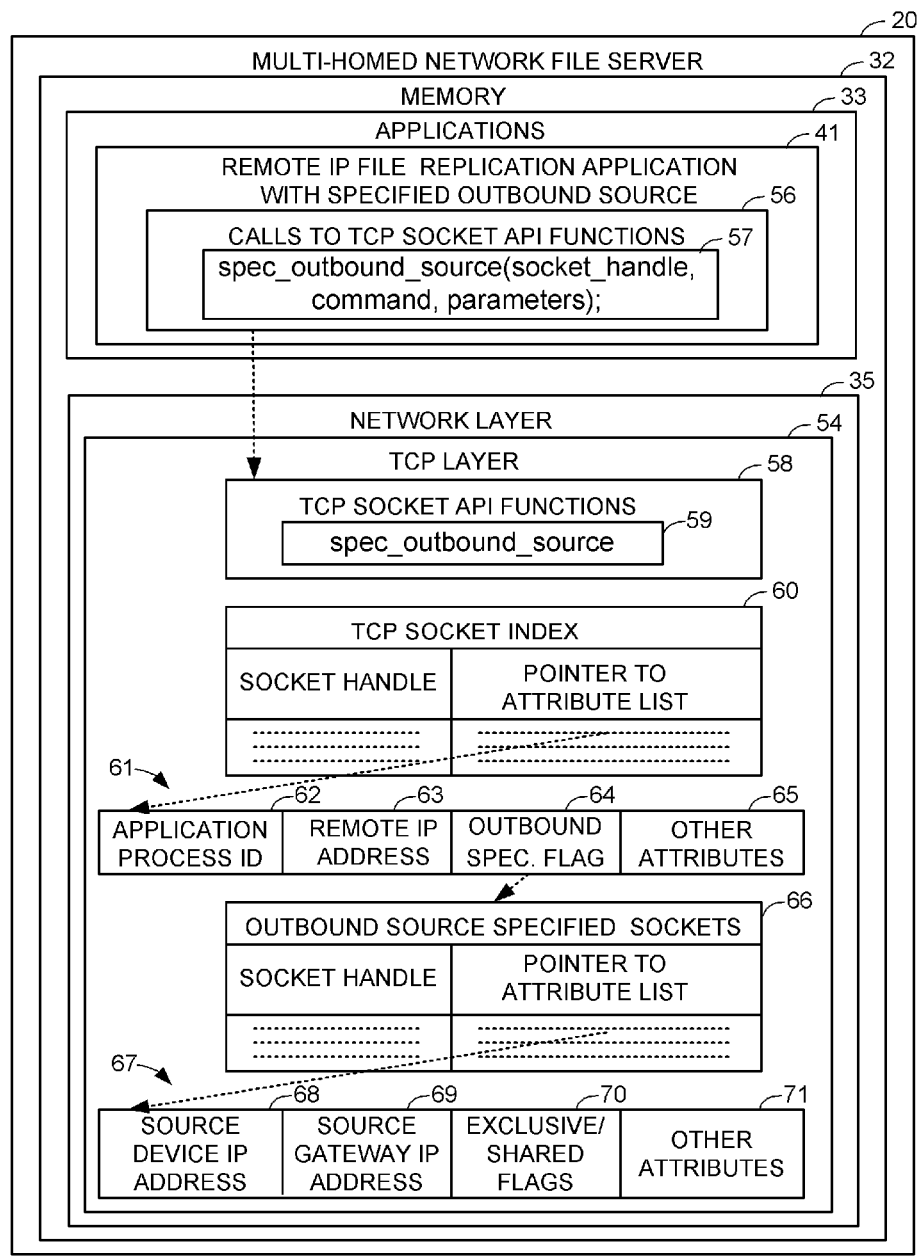
FIG. 2 show details of the programming of the multi-homed host of FIG. 1 for a case in which the multi-homed host is a network file server and the application with a specified outbound source is a remote IP file replication application.

FIG. 2 show details of the programming of the multi-homed host of FIG. 1 for a case in which the multi-homed host is a network file server and the application 41 with a specified outbound source is a remote IP file replication application. In this case the application 41 includes calls 56 to TCP socket API functions of a TCP layer 58 in the network layer 35 in order to establish a TCP connection to a remote destination.

For example, if the multi-homed host 20 uses the Microsoft WINDOWS (Trademark) operating system, then the host application 41 establishes a TCP socket by the following "Winsock dll" calls:

```
socket(AF_INET, SOCK_STREAM, 0);    /* open a TCP socket */
address.sin_family=AF_INET;           /* set internet addressing family */
address.sin_port = htons(Port_Number);   /* set target port number */
address.sin_addr.s_addr=inet_addr(*127.0.0.1) /* set target IP addr.*/
connect (sock, (struct sockaddr *) &address, sizeof(address));    /* establish
connection */
```

The host application transmits data over the connection by invoking a "send" function:
send(sock, File_Buf, strlen(File_Buf),0);
The host application receives data over the connection by invoking a "recv" function:
recv(sock, File_Buf, BIFF_LEN, 0);

As shown in FIG. 2, when a TCP connection has been established, the TCP connection is found in a TCP socket index 60 maintained by the TCP layer 58. The TCP socket index 60 includes the socket handle and a pointer to an attribute list 61 for the TCP connection. The attribute list 61 for the TCP connection includes an application process ID, a remote IP address, and other attributes 65.

To permit the host application 41 to specify a particular outbound source path for a TCP connection, the TCP socket API functions are provided with a new "spec_outboud_source" function 59, and an "outbound spec. flag" 64 is included in the TCP attribute list 61. A call 57 to this new API function includes the "socket_handle", a command code, and additional parameters appropriate for the particular command, as will be further described below with reference to FIGS. 3, 4, and 5. The commands include a "set" command, a "clear" command, a "read" command, and a "modify" command.

Once the host application 41 has invoked the "spec_outboud_source" function to set a particular outbound source path for a TCP connection, the "outbound spec. flag" is set, and the socket handle and a pointer to an attribute list 67 is put in an index 60 of outbound source specified sockets. The attribute list 67 includes parameters specified by the host application in the call to the "spec_outbound_source" function, including a source device IP address 68, a source gateway IP address 69, exclusive/shared flags 70, and other attributes 71. The exclusive/shared flags 70, for example, indicate whether the host application has requested exclusive use of the source device or source gateway for outbound transmission. If the host application has requested exclusive use of the source device or source gateway for outbound transmission, then the network layer will remove the source device or source gateway from the operating system supplied routing tables.

A host application may specify a source path for a specified remote connection by specifying a particular one of the network interfaces, or by specifying a particular one of the gateways, or by specifying both a particular network interface and a particular gateway. If the host application specifies a particular one of the network interfaces but does not specify a particular one of the gateways for a remote connection, then the network layer program will dynamically select a particular one of the gateways based on current loading conditions as the host computer transmits data packets over the specified remote connection to the data network. If the host application specifies a particular one of the gateways but does not specify a particular one of the network interface devices for the specified remote connection, then the network layer program will dynamically select a particular network interface device based on current loading conditions as the host computer transmits data packets over the specified remote connection to the data network.

Figure 3:
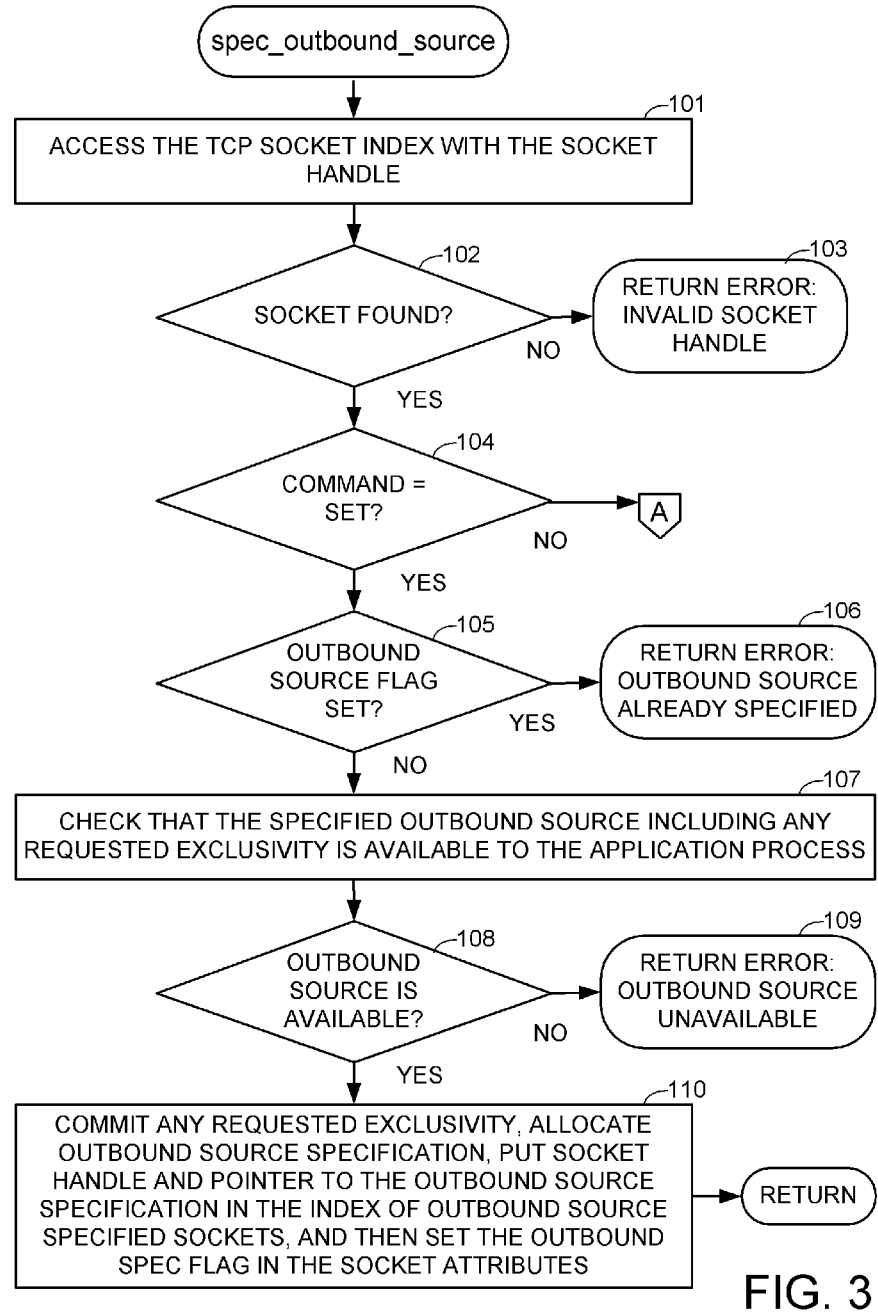
FIGS. 3, 4, and 5 together comprise a flowchart of an application program interface (API) function invoked by a host application to specify a particular outbound source path for a remote connection.
Figure 4:
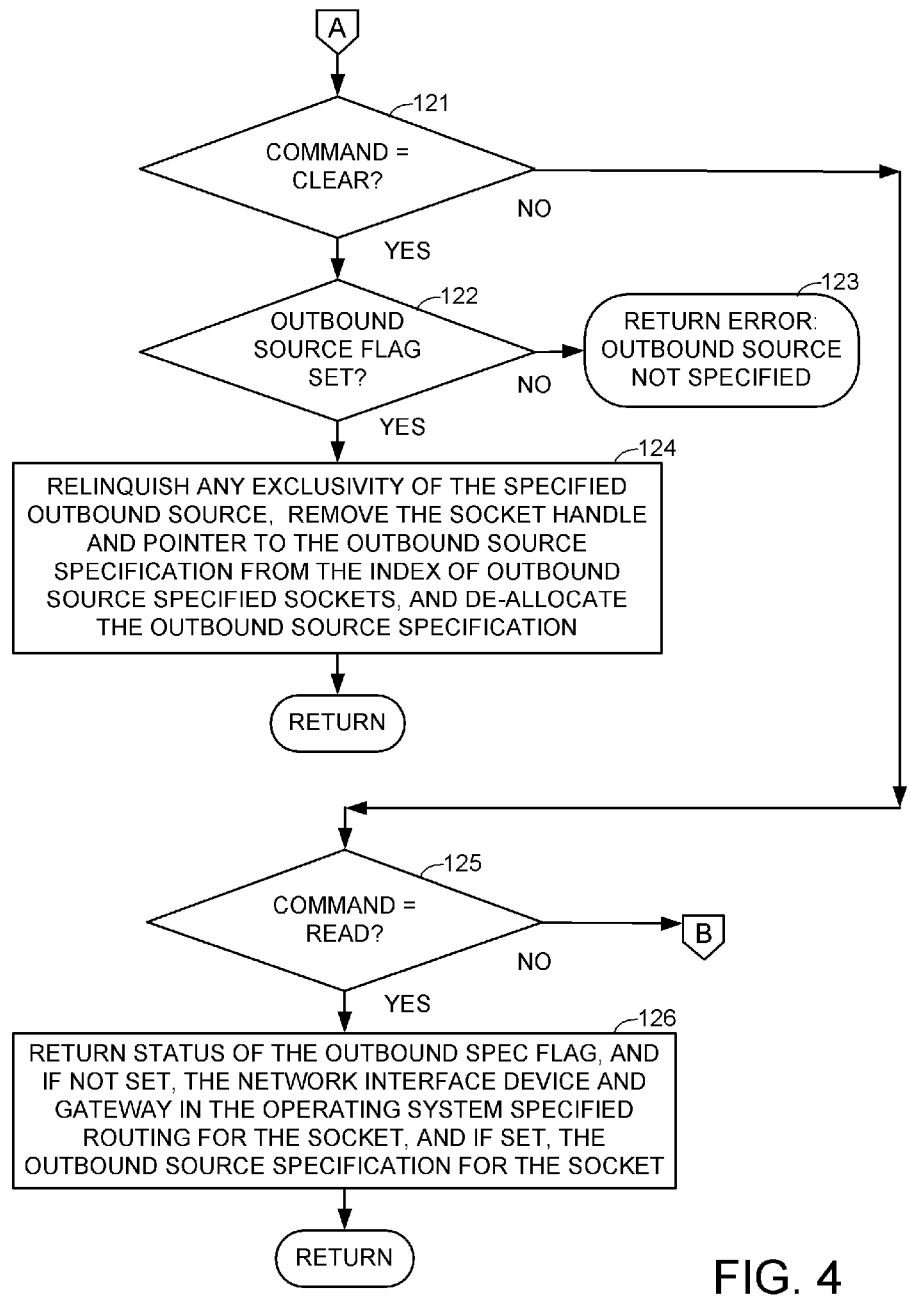
Figure 5:
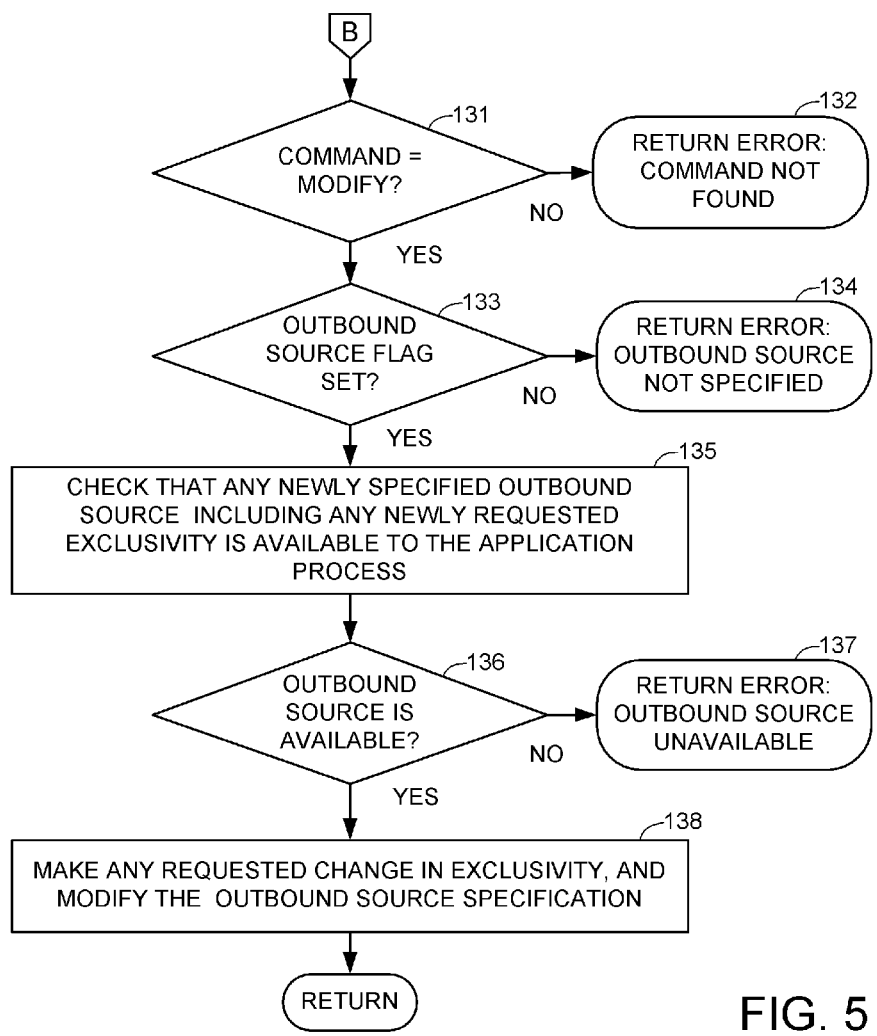

FIGS. 3, 4, and 5 together comprise a flowchart of an application program interface (API) function invoked by a host application to specify a particular outbound source path for a remote connection. In a first step 101, the data processor accesses the TCP socket index with the socket handle. In step 102, if the socket is not found in the socket index, then execution branches to step 103 to return an error code indicating that the socket handle is invalid.

In step 102, if the socket is found in the socket index, then execution continues to step 104. In step 104, if the command is "set", then execution continues to step 105. In step 105, if the outbound source flag is set for the socket, then execution branches to step 106 to return an error code indicating that the outbound source is already specified for the socket.

In step 105, if the outbound source flag is not set for the socket, then execution continues to step 107. In step 107, the data processor checks that the specified outbound source including any requested exclusivity is available to the application process. In step 108, if the outbound source is available, then execution continues to step 110. In step 110, any requested exclusivity is committed (by flagging as unavailable the specified network interface device or gateway in a list of outbound sources usable in the operating system supplied routing tables), and memory for the outbound source specification (i.e., the source attribute list 37 in FIG. 2) is allocated, and the socket handle and a pointer to the outbound source specification is placed in the index of outbound source specified sockets, and then the outbound spec. flag is set in the socket attributes. After step 110, the "set" command has been successfully processed, and execution returns.

In step 104, if the command is not "set," then execution branches to step 121 of FIG. 4. In step 121, if the command is "clear", then execution continues from step 121 to step 122. In step 122, if the outbound source flag is not set, execution branches to return an error code indicating that the outbound source is not specified. In step 122, if the outbound source flag is set, then execution continues to step 124. In step 124, any exclusivity of the specified outbound source is relinquished, the socket handle and pointer to the outbound source specification are removed from the index of outbound source specified sockets, and the memory of the outbound source specification is deallocated. After step 124, processing of the "clear" command is finished, and execution returns.

In step 122, if the command is not "clear", then execution branches from step 121 to step 125. In step 125, if the command is "read," then execution continues to step 126. In step 126, the TCP layer returns, to the host application, the status of the outbound spec. flag, and if the outbound spec. flag is not set, the network interface device and gateway in the operating system specified routing for the socket, and if set, the outbound source specification for the socket. After step 126, processing of the "read" command is finished, and execution returns.

In step 126, if the command is not "read", then execution continues to step 131 of FIG. 5. In step 131, if the command is not "modify", then execution branches to step 132 to return an error code indicating that the command has not been found. In step 131, if the command is "modify", then execution continues to step 133. In step 133, if the outbound source flag is not set, then execution branches to step 134 to return an error code indicating that the outbound source is not specified.

In step 133, if the outbound source flag is set, then execution continues to step 135. In step 135, the data processor checks that any newly specified outbound source including any newly requested exclusivity is available to the application process. In step 136, if a newly specified outbound source is not available, then execution branches to step 137 to return an error code indicating that the outbound source is unavailable. Otherwise, if in step 136 the outbound source is available, then execution continues to step 138 to make any requested change in exclusivity, and modify the outbound source specification. After step 138, processing of the "modify" command is finished, and execution returns.

Figure 6:
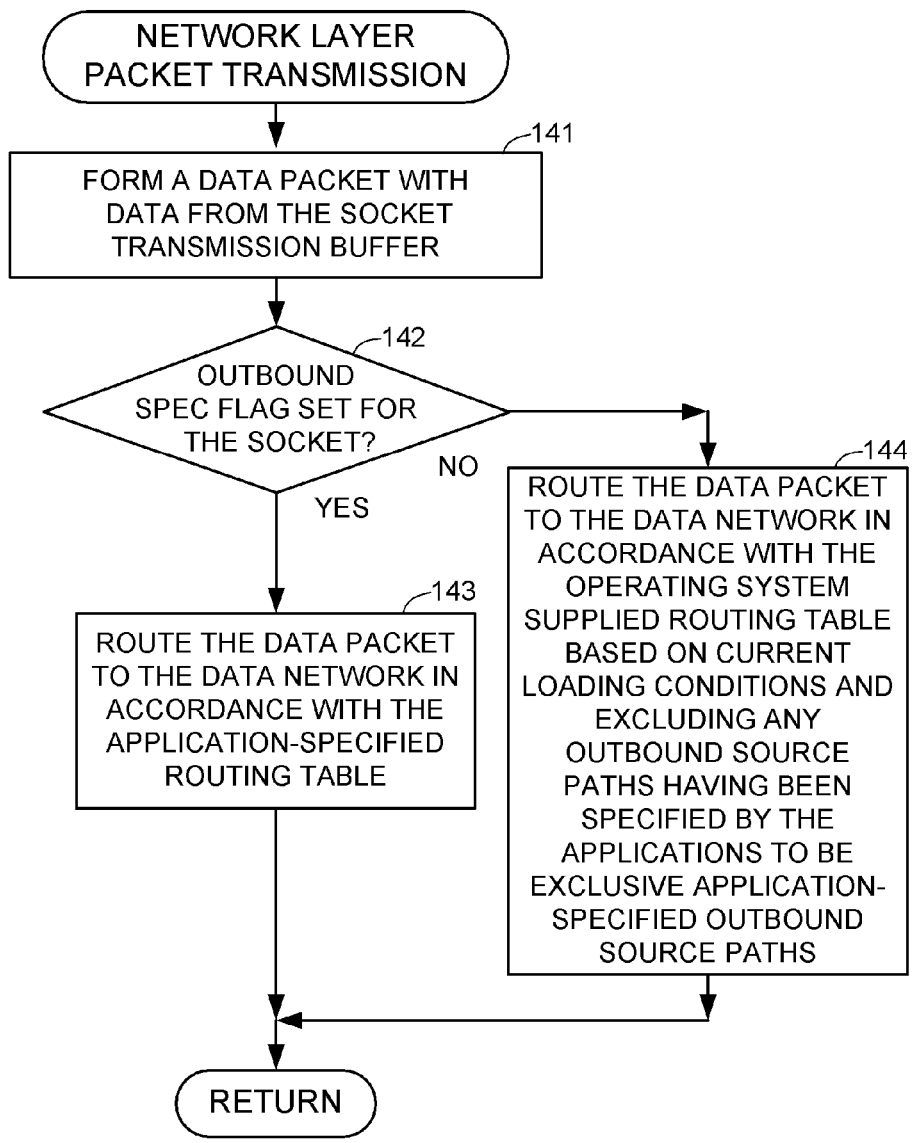
FIG. 6 is a flowchart of a network layer packet transmission routine.

FIG. 6 shows a network layer packet transmission routine for transmitting data from a specified socket. In step 141, the data processor forms a data packet with data from the socket transmission buffer. In step 142, if the outbound spec. flag is set for the socket, then execution continues to step 143. In step 143, the data processor routes the data packet to the data network in accordance with the application-specified routing table, and execution returns.

In step 142, if the outbound spec. flag is not set for the socket, then execution branches to step 144. In step 144, the data processor routes the data packet to the data network in accordance with the outbound source path for the socket as found in the operating system supplied routing table. The outbound source path for the socket in the operating system supplied routing table is based on current loading conditions of the possible outbound source paths and excludes any outbound source paths having been specified by the applications to be exclusive application-specified outbound source paths. After step 144, execution returns.

In view of the above, there has been described a way for the network layer of a host computer to provide a host application with the ability to specify a particular outbound source path when establishing a remote connection. For example, an application program of a multi-homed host computer at a multi-homed Internet site specifies a destination IP address, a local network interface device and a local site gateway to the network layer of the host computer when establishing a remote TCP connection to the destination IP address, and then the network layer of the operating system of the host computer uses only this specified outbound source path for the remote TCP connection instead of an outbound source path from an operating system supplied routing table. This allows the host application to have control over its remote output paths and provides the host application with the ability to create private remote connections.

What is claimed is:

1. A computer-implemented method of routing data to a data network from a host computer, the host computer having memory and at least one data processor coupled to the memory for executing programs in the memory, the host computer being connected to the data network to provide a plurality of outbound source paths for transmission of data from the host computer to the data network, said method comprising:

said at least one data processor executing a network layer program in the memory to establish a remote connection for transmission of data from execution of an application program in the memory to a remote destination in the data network, and to select a particular outbound source path for transmission of the data from the execution of the application program over the remote connection when the execution of the application program does not specify a particular outbound source path for the transmission of data from the execution of the application program over the remote connection, and to use an application-specified outbound source path for transmission of the data from the execution of the application program over the remote connection when the execution of the application program specifies a particular outbound source path for the transmission of data from the execution of the application program over the remote connection.

2. The method as claimed in claim 1, wherein the host computer has multiple network interface devices for transmitting data from the host computer to the data network, and execution of the application program by said at least one data processor specifies a particular one of the network interface devices to be used for transmission of data from the execution of the application program over the remote connection, and said at least one data processor executes the network layer program to transmit data from the execution of the application program through the particular one of the network interface devices upon finding that the remote connection has an application-specified outbound source path and the application-specified outbound source path for the remote connection includes the particular one of the network interface devices.

3. The method as claimed in claim 1, wherein multiple gateways connect the host computer to the data network for transmission of data from the host computer to the data network, and execution of the application program specifies a particular one of the gateways to be used for transmission of data from the execution of the application program to the data network over the remote connection, and said at least one data processor executes the network layer program to transmit data from the execution of the application program through the particular one of the gateways upon finding that the remote connection has an application-specified outbound source path and the application-specified outbound source path for the remote connection includes the particular one of the gateways.

4. The method as claimed in claim 1, wherein multiple gateways connect the host computer to the data network for transmission of data from the host computer to the data network, and the host computer has multiple network interface devices for transmitting data from the host computer to the gateways, and execution of the application program by said at least one data processor specifies a particular one of the network interface devices and a particular one of the gateways to be used for transmission of data from the execution of the application program over the remote connection, and said at least one data processor executes the network layer program to transmit data from the execution of the application program through the particular one of the network interface devices to the particular one of the gateways upon finding that the remote connection has an application-specified outbound source path and the application-specified outbound source path for the remote connection includes the particular one of the network interface devices and the particular one of the gateways.

5. The method as claimed in claim 1, which further includes the data processor executing the application program to indicate to the network layer program that a particular outbound source path specified by the application program is to be used exclusively for transmission of data from the execution of the application program over the remote connection, and in response the execution of the network layer program excludes the particular outbound source path from the outbound source paths used by the network layer program for the transmission of data over other remote connections.

6. The method as claimed in claim 1, wherein the network layer program includes an application program interface (API) function that is invoked by execution of the application program to specify that a particular one of the outbound source paths is to be used for transmission of data from the execution of the application program over a specified remote connection.

7. The method as claimed in claim 6, wherein execution of the network layer program by said at least one data processor maintains, in the memory of the host computer, an index of the remote connections, and attributes of the remote connections, and execution of the network layer program by said at least one data processor responds to the invocation of the application program interface (API) function by setting an attribute of the specified remote connection to indicate that there is an application-specified outbound source path for the specified remote connection, and storing, in the memory of the host computer, a specification of the particular one of the outbound source paths that is to be used for the specified remote connection.

8. The method as claimed in claim 7, wherein execution of the network layer program by said at least one data processor responds to data for transmission over the specified remote connection by searching the index of remote connections to find that the attribute of the specified remote connection indicates that there is an application-specified outbound source path for the specified remote connection, and in response to finding that the attribute of the specified remote connection indicates that there is an application-specified outbound source path for the specified remote connection, also finding the specification of the particular one of the outbound source paths that is to be used for the specified remote connection, and using the specification of the particular one of the outbound source paths that is to be used for the specified remote connection for routing the data for transmission over the specified remote connection from the host computer to the data network over the particular one of the outbound source paths that is to be used for the specified remote connection.

9. A computer-implemented method of routing data to the Internet from a host computer, the host computer having memory and at least one data processor coupled to the memory for executing programs in the memory, the host computer being connected to the Internet to provide a plurality of outbound source paths for transmission of data from the host computer to the Internet, said method comprising:
said at least one data processor executing a network layer program in the memory to establish a remote Transmission Control Protocol (TCP) connection for transmission of data from execution of an application program in the memory to a remote destination in the Internet, and to select based on current loading conditions a particular outbound source path for transmission of the data from the execution of the application program over the remote TCP connection when the execution of the application program does not specify a particular outbound source path for the transmission of data from the execution of the application program over the remote TCP connection, and to use an application-specified outbound source path for transmission of the data from the execution of the application program over the remote TCP connection when the execution of the application program specifies a particular outbound source path for the transmission of data from the execution of the application program over the remote TCP connection.

10. The method as claimed in claim 9, wherein the host computer is a multi-homed host having multiple network interface devices for transmitting data from the host computer to the data network, and execution of the application program by said at least one data processor specifies a particular one of the network interface devices to be used for transmission of data from the execution of the application program over the remote TCP connection, and said at least one data processor executes the network layer program to transmit data from the execution of the application program through the particular one of the network interface devices upon finding that the remote TCP connection has an application-specified outbound source path and the application-specified outbound source path for the remote TCP connection includes the particular one of the network interface devices.

11. The method as claimed in claim 9, wherein the host computer is in a multi-homed Internet site having multiple gateways connecting the host computer to the Internet for transmission of data from the host computer to the Internet, and execution of the application program specifies a particular one of the gateways to be used for transmission of data from the host computer to the Internet over the remote TCP connection, and said at least one data processor executes the network layer program to transmit data from the execution of the application program through the particular one of the gateways upon finding that the remote TCP connection has an application-specified outbound source path and the application-specified outbound source path for the remote TCP connection includes the particular one of the gateways.

12. The method as claimed in claim 9, wherein the host computer is in a multi-homed Internet site having multiple gateways connect the host computer to the data network for transmission of data from the host computer to the Internet, and the host computer is a multi-homed host having multiple network interface devices for transmitting data from the host computer to the gateways, and execution of the application program by said at least one data processor specifies a particular one of the network interface devices and a particular one of the gateways to be used for transmission of data from the execution of the application program over the remote TCP connection, and said at least one data processor executes the network layer program to transmit data from the execution of the application program through the particular one of the network interface devices to the particular one of the gateways upon finding that the remote TCP connection has an application-specified outbound source path and the application-specified outbound source path for the remote TCP connection includes the particular one of the network interface devices and the particular one of the gateways.

13. A host computer comprising:
at least one data processor;
a plurality of network interface devices coupled to said at least one data processor for connecting the host computer to a data network for providing a plurality of outbound source paths for transmission of data from the host computer to the data network; and
memory storing an application program and a network layer program, the memory being coupled to said at least data processor for execution of the application program and the network layer program by said at least one data processor;
the network layer program begin executable by said at least one data processor to establish a remote connection for transmission of data from execution of the application program to a remote destination in the data network, and to select a particular outbound source path for transmission of the data from the execution of the application program over the remote connection when the execution of the application program does not specify a particular outbound source path for the transmission of data from the execution of the application program over the remote connection, and to use application-specified outbound source path for transmission of the data from the execution of the application program over the remote connection when the execution of the application program specifies a particular outbound source path for the transmission of data from the execution of the application program over the remote connection.

14. The host computer as claimed in claim 13, wherein the application program specifies a particular one of the network interface devices to be used by the execution of the network layer program for the transmission of data from the execution of the application program to the data network over the remote connection.

15. The host computer as claimed in claim 13, wherein the application program specifies a particular gateway to be used by the execution of the network layer program by said at least one data processor for routing data from the execution of the application program to the data network over the remote connection.

16. The host computer as claimed in claim 13, wherein the application program specifies a particular one of the network interface devices and a particular gateway to be used by the execution of the network layer program for the transmission of data from the execution the application program to the gateway and from the gateway to the data network over the remote connection.

17. The host computer as claimed in claim 13, wherein the application program specifies that a particular one of the outbound source paths is to be used exclusively for the transmission of data from computer the execution of the application program to the data network over the remote connection, and the network layer program is executable by said at least one data processor to respond to the specification by the application program that the particular one of the outbound source paths is to be used exclusively for the transmission of data from the execution of the application program to the data network over the remote connection by excluding the particular one of the outbound source paths from the outbound source paths used by the network layer program for the transmission of data over other remote connections.

18. The host computer as claimed in claim 13, wherein the network layer program includes an application program interface (API) function that is executable by said at least one data processor and called by the application program to specify that a particular one of the outbound source paths is to be used for transmission of data from execution of the application program over a specified remote connection.

19. The host computer as claimed in claim 18, wherein execution of the network layer program by said at least one data processor maintains, in the memory of the host computer, an index of the remote connections, and attributes of the remote connections, and execution of the network layer program by said at least one data processor responds to invocation of the application program interface (API) function by setting an attribute of the specified remote connection to indicate that there is an application-specified outbound source path for the specified remote connection, and storing, in the memory of the host computer, a specification of the particular one of the outbound source paths that is to be used for the specified remote connection.

20. The host computer as claimed in claim 19, wherein execution of the network layer program by said at least one data processor responds to data for transmission over the specified remote connection by searching the index of remote connections to find that the attribute of the specified remote connection indicates that there is an application-specified outbound source path for the specified remote connection, and in response to finding that the attribute of the specified remote connection indicates that there is an application-specified outbound source path for the specified remote connection, also finding the specification of the particular one of the outbound source paths that is to be used for the specified remote connection, and using the specification of the particular one of the outbound source paths that is to be used for the specified remote connection for routing the data for transmission over the specified remote connection from the host computer to the data network over the particular one of the outbound source paths that is to be used for the specified remote connection.

* * * * *